March 1, 1955  W. H. REVOIR, JR., ET AL  2,703,153
AIR FILTER
Filed March 18, 1953
Fig. 1
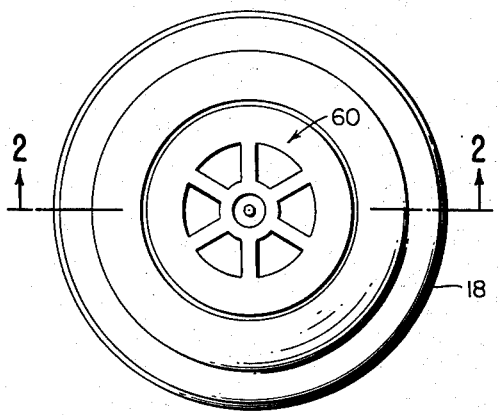
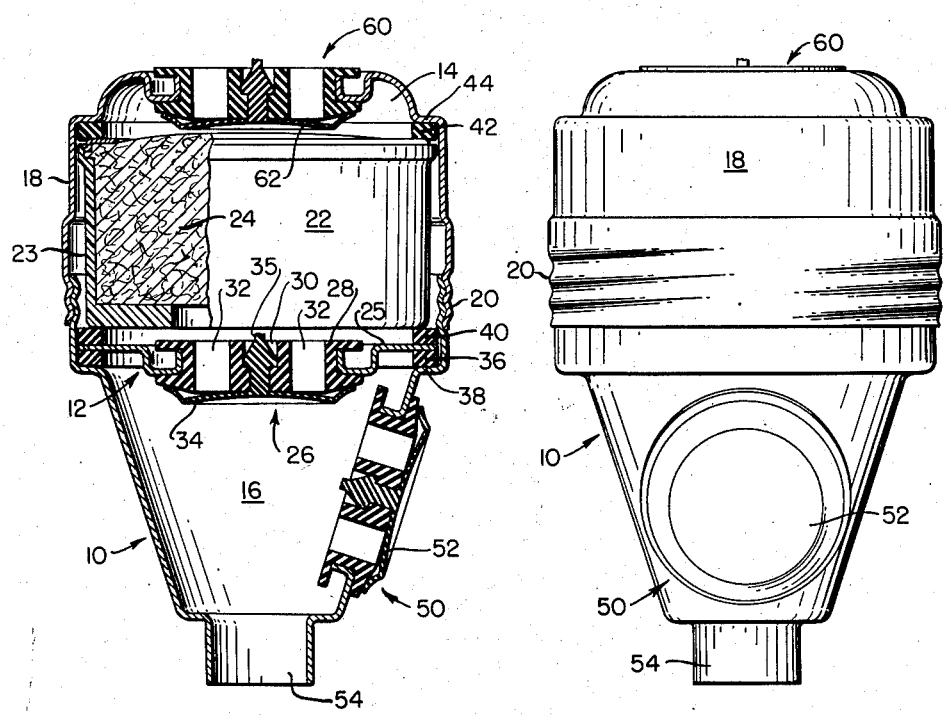
Fig. 2    Fig. 3
INVENTORS
WM. H. REVOIR, JR.
VERITY C. SMITH
BY
Kenway, Jenney, Witter & Hildreth
ATTORNEYS

United States Patent Office 2,703,153
Patented Mar. 1, 1955

2,703,153

AIR FILTER

William H. Revoir, Jr., Southbridge, and Verity C. Smith, West Roxbury, Mass., assignors to Barnstead Still and Sterilizer Co., Boston, Mass., a corporation of Massachusetts, and American Optical Company, Southbridge, Mass., a corporation of Massachusetts Application March 18, 1953, Serial No. 343,152

2 Claims. (Cl. 183—40)

This invention relates to air filters and more particularly to an air filter adapted to cooperate with a water tank or the like to protect the contents against contamination of outside air. The invention is especially useful in association with water stills used in industrial plants, hospitals, laboratories, etc. for protecting the purified water from possible contamination.

Our improved filter comprises a housing having two chambers separated by a partition. One of the chambers is adapted to house a removable and replaceable air filtering cartridge and the other chamber is provided with means for cooperating with a tank automatically to vent the tank and supply air thereto while permitting only air passing through the filtering cartridge to enter the tank. The production of an improved filter for thus protecting a tank and its contents against contamination comprises the primary object of the invention.

A major portion of the filtering cartridge receiving part of the housing includes a chambered cup for enclosing the cartridge, together with means for detachably securing the cup to the cooperating part of the housing. This portion of the housing also includes means normally keeping the cartridge and its chamber closed against exposure from outside air but permitting intake of air passing through the cartridge and filter. The production of a filter embodying these features comprises a further object of the invention.

These and other features of the invention will be best understood and appreciated from the following description of a preferred embodiment thereof selected for purposes of illustration and shown in the accompanying drawing in which—

Fig. 1 is a front end view of the air filter,

Fig. 2 is a longitudinal sectional view taken on line 2—2 of Fig. 1,

Fig. 3 is a plan elevation.

In the drawing, 10 indicates a housing preferably of sheet metal and having a partition 12 dividing the housing into two chambers 14 and 16. The housing comprises a main portion including the partition 12 and chamber 16 and a removable cooperating portion 18 in the form of a chambered cup. The portion 18 screw threads to the main portion at 20 and provides the chamber 14.

The chamber 14 is adapted to house a removable filter cartridge 22 embodying a cylindrical shell 23 open at both ends and supporting air filtering material 24 within the shell. The removable cup permits removal and replacement of the cartridge. The partition 12 comprises an annular disk-like member 25 having a centrally disposed opening and supporting a flap valve 26 within the opening. The flap valve comprises a soft rubber body 28 with a centrally disposed opening 30 therethrough and other openings 32 disposed around the opening 30. A valve member including a soft rubber disk 34 on a stem 35 is carried by the body, the stem engaging within the opening 30 and the disk 34 normally closing the outer ends of the openings 32.

The partition member 25 is supported adjacent to its periphery on an annular gasket 36 resting on a ledge 38 of the housing, a like annular gasket 40 engaging the other face of the member in opposed relation to the gasket 36. The gasket 40 is adapted to receive and support the cartridge 22 adjacent to the peripheral portion of its inner end. A like gasket 42 resting on a ledge 44 of the cup 18 is adapted to engage the outer end of the cartridge in like manner, and the two gaskets 40 and 42 cooperate to seal the chamber 14 against the passage of air except through the cartridge.

A valve 50 like the valve 12 is mounted in the side wall of the main housing 10 and includes a soft rubber disk 52 normally closing the valve against passage of air into the chamber 16 but permitting escape of air therefrom. The chamber 16 also has an opening 54 thereinto adapted to be connected to the top portion of a water storage tank or the like. A valve 60 like the valves 26 and 50 is mounted in the end wall of the cup 18 and includes a soft rubber disk 62 normally closing the valve against passage of air outwardly of the chamber 14 but permitting passage of air into the chamber to the outer end of the filter cartridge 22.

Our novel air filter is particularly adapted to cooperate with a water tank or the like to protect the contents of the tank from exposure to impure air, contaminating gases and vapors and suspended particle matters that might be absorbed by and deleteriously affect the tank contents. In using the filter, the opening 54 is connected by an air-tight conduit to the top portion of the tank. When no water is being drawn from the tank or when the tank is not being filled with water all three valves 26, 50 and 60 remain closed, thus fully protecting the tank and cartridge from exposure. When water is being drawn from the tank the valves 60 and 26 open to permit air to pass to and through the cartridge 22 and into the tank, the gaskets 36, 40 and 42 compelling all such air to pass through the filter. When water is being added to the tank the valves 26 and 60 remain closed and the valve 50 opens to permit the escape of air from the chamber 16.

It will be understood that the filter material 24 is such as to remove from the incoming air such gases and particles as might deleteriously affect the water in the tank. Attention is also called to the protection given to the filter cartridge by the valves 26 and 60. If the cartridge was continuously exposed to both the atmosphere outside the tank (which may contain various vapors, gases, and suspended particles) and the atmosphere in the tank (which may be highly humid) the useful life of the cartridge would be considerably shortened. The primary purpose of the cartridge is to purify the air coming into the tank and the normal shielding of the filter from both the tank air and the outside air gives maximum efficiency and life to the filter. The valve 50 is normally closed and prevents contamination by unfiltered air.

It will be appreciated that our novel filter can be used in any combination which it will serve and for which it is adapted.

Having thus disclosed our invention, what we claim as new and desire to secure by Letters Patent is:

1. An air filter for water storage tanks and the like, comprising a housing having two chambers therein separated by a partition having an opening therethrough, means providing an air exit passage from the second chamber adapted to be connected to the top portion of a water storage tank, a removable filter cartridge in the first chamber, the first chamber part of the housing including a movable portion permitting removal and replacement of the filter cartridge and having an inlet opening permitting the intake of air to the outer end of the cartridge, an inwardly opening flap valve normally closing the inlet opening, means including a normally closed flap valve permitting passage of air in one direction only through the partition opening from the first chamber to the second chamber, means within the first chamber preventing the passage of air therethrough externally of the cartridge, and means including a normally closed and outwardly opening flap valve for permitting outward escape of air from the second chamber.

2. The air filter defined in claim 1 in which the partition comprises an annular disk-like member supporting said flap valve at the opening through the partition, the housing having an annular ledge therein at the junction of the two chambers, and two annular gaskets in opposed supporting relation at opposite sides of the peripheral portion of said member, one of said gaskets being seated on the ledge and the cartridge resting on the other gasket.

References Cited in the file of this patent

UNITED STATES PATENTS

| | | |
|---|---|---|
| 1,474,205 | Mase | Nov. 13, 1923 |
| 1,789,262 | Monro et al. | Jan. 13, 1931 |
| 2,151,593 | Glanzer | Mar. 21, 1939 |

FOREIGN PATENTS

| | | |
|---|---|---|
| 275,393 | Italy | June 21, 1930 |